June 20, 1961 F. W. LUERSSEN 2,989,297
COMBINED MELTING HEARTH AND GAS REFORMER APPARATUS
Filed June 9, 1958 2 Sheets-Sheet 1
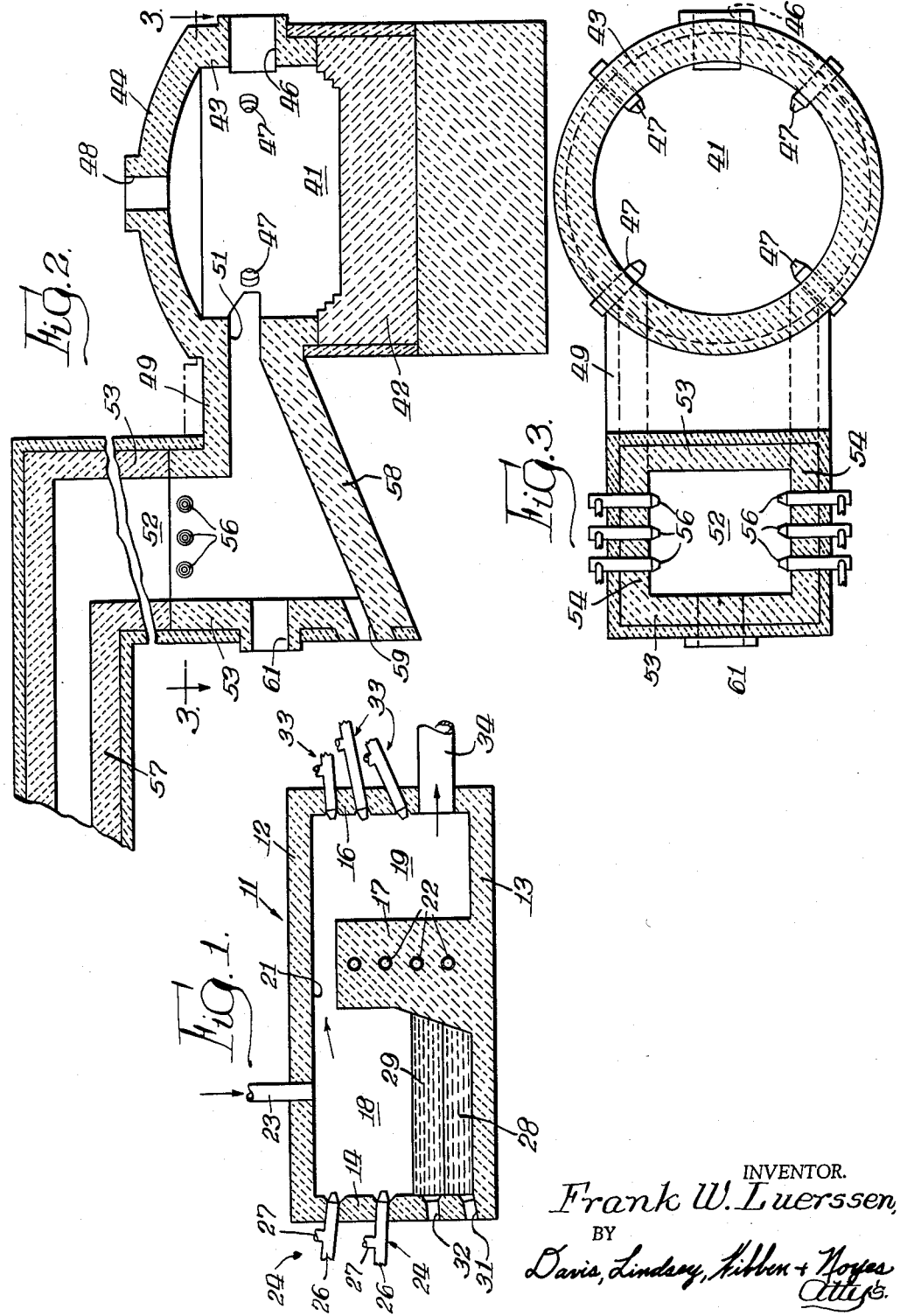
INVENTOR.
Frank W. Luerssen,
BY
Davis, Lindsey, Hibben + Noyes
Attys.

June 20, 1961  F. W. LUERSSEN  2,989,297
COMBINED MELTING HEARTH AND GAS REFORMER APPARATUS
Filed June 9, 1953  2 Sheets-Sheet 2
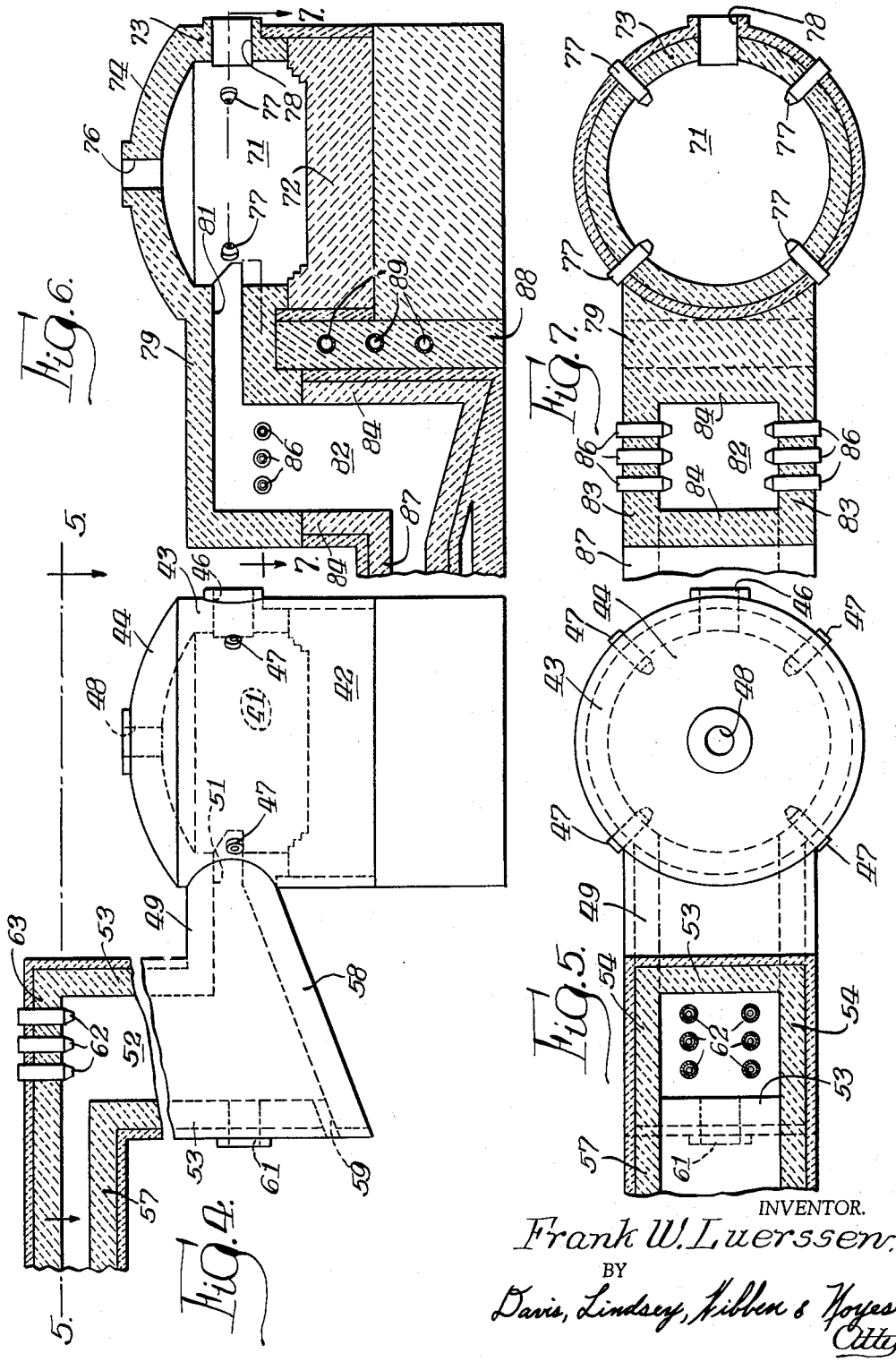
INVENTOR.
Frank W. Luerssen,
BY
Davis, Lindsey, Hibben & Noyes
Attys.

United States Patent Office 2,989,297
Patented June 20, 1961

2,989,297
COMBINED MELTING HEARTH AND GAS REFORMER APPARATUS
Frank W. Luerssen, Munster, Ind., assignor to Inland Steel Company, Chicago, Ill., a corporation of Delaware
Filed June 9, 1958, Ser. No. 740,780
10 Claims. (Cl. 266—33)

This invention relates to a novel combined melting hearth and gas reformer apparatus for melting reduced iron ore and producing a CO-rich gas. This application is a continuation in part of my copending application Serial No. 634,282, filed January 15, 1957, now U.S. Patent No. 2,928,730, issued March 15, 1960.

Various schemes have been suggested in the prior art for the direct reduction of iron oxide ore with a reducing gas comprising CO and/or $H_2$. In some instances provision is also made for melting the reduced iron ore to obtain molten iron as a final product of the process. In the latter case it is necessary to provide suitable facilities for melting the reduced iron ore and also for generating a suitable quantity of reducing gas having the desired composition. In accordance with the present invention, a novel unitary apparatus is provided for accomplishing both the melting and gas generation functions.

In my copending application Serial No. 634,282, filed January 15, 1957, now U.S. Patent No. 2,928,730, issued March 15, 1960, an integrated process is disclosed for reducing iron oxide ore with CO-rich reducing gas and melting the reduced iron ore. Briefly, the process involves three stages: (1) a combined melting and gas generator zone wherein a fuel is burned with oxygen in order to melt and separate the iron from the reduced ore and at the same time producing combustion gas, (2) an upgrading or gas reforming zone wherein the combustion gas from the first zone is treated to increase its reducing capacity, and (3) a reduction zone wherein subdivided iron ore is contacted with the reformed reducing gas from the second zone and from which the resultant reduced iron ore is passed to the first zone.

In order to supply the thermal requirements of the melting operation, it has been found to be necessary to carry the combustion of fuel in the melting zone to a high degree of completion with the result that the combustion gas in the melting zone has a relatively high $CO_2$ content. Because of its high $CO_2$ content, the combustion gas must be upgraded or reformed before it can be used for ore reduction purposes. In order to achieve an economically feasible process it has also been found that the reforming operation must be carried out by introducing the high $CO_2$ content combustion gas into a reforming zone wherein excess fuel is burned with oxygen and the $CO_2$ content of the combustion gas is thereby reacted with the carbon or hydrogen content of a part of the fuel to form CO. Thus, the combustion of fuel in the melting zone is carried out at a relatively high temperature on the order of 2900° F. to 3500° F. but the endothermic reduction of $CO_2$ to CO in the reforming zone is accomplished at a substantially lower temperature level on the order of 1900° F. to 2400° F. Accordingly, it is necessary to provide some means for retarding heat transfer and maintaining the desired thermal differential between the melting and reforming stages.

The broad object of the invention is to provide a novel combined apparatus for effecting melting of reduced iron ore and generation of a CO-rich gas.

A further object of the invention is to provide a novel unitary apparatus for conducting a relatively high temperature combustion operation and a relatively lower temperature gas reforming operation in separate zones while maintaining a desired temperature differential between the zones.

Another object of the invention is to provide a novel combined apparatus of the foregoing character which is especially adapted for effecting reforming of a high $CO_2$ content combustion gas by means of a fuel-oxygen burner.

Other objects and advantages of the invention will become evident from the subsequent detailed description as taken in conjunction with the accompanying drawings, wherein:

FIG. 1 is a sectional view of an apparatus comprising one specific embodiment of the invention;

FIG. 2 is a sectional view showing another embodiment of the invention;

FIG. 3 is a transverse sectional view taken along the line 3—3 of FIG. 2;

FIG. 4 is an elevational view, with portions thereof in section, showing a modification of the previous embodiment;

FIG. 5 is a transverse sectional view as taken along the line 5—5 of FIG. 4;

FIG. 6 is a sectional view showing still another embodiment of the invention; and FIG. 7 is a transverse sectional view taken along the line 7—7 of FIG. 6.

Referring first to FIG. 1, the combined melting and gas generator apparatus comprises a unitary refractory lined chamber or enclosure 11 which in this instance has an elongated rectangular configuration with a top wall 12, a bottom wall 13, and end walls 14 and 16. The chamber 11 is also provided with an upright insulating wall or partition 17 having substantial thickness and extending upwardly from the bottom wall 13 so as to divide the chamber 11 into a melting zone 18 at one side of the wall 17 and a gas reforming zone 19 at the other side of the wall 17. The wall 17 terminates at its upper end in spaced relation below the top wall 12 of the chamber 11 so as to provide a restricted laterally extending gas passage 21 interconnecting the zones 18 and 19. The wall 17 also has cooling tubes 22 embedded therein and through which water or other cooling liquid may be passed for cooling the wall 17.

Reduced iron ore particles are fed to the melting zone 18 from a reducing zone (not shown) through an inlet conduit 23 in the top wall 12. A plurality of burners 24 are mounted in the end wall 14 for burning fuel with oxygen to melt the reduced iron ore introduced at 23. Preferably, the fuel comprises pulverized coal which is mixed thoroughly with commercial grade oxygen which may have a purity on the order of 99% free oxygen. Thus, the oxygen may be introduced through a branch 26 of each burner 24 and the pulverized coal may be introduced to the burner through a branch 27 so that the pulverized coal is suspended in the oxygen and premixed therewith prior to ignition at the burner outlet.

As will be evident from FIG. 1, the subdivided reduced iron ore passes downwardly from the inlet 23 through the flames and combustion products generated by the burners 24 in the zone 18, and a pool or bath of molten iron, designated at 28, is collected at the bottom of the zone 18. A supernatant slag layer 29 may also be formed, the slag resulting from the residual ash of the coal and the gangue constituents of the reduced ore, particularly silica and alumina. A pair of outlets 31 and 32 are provided in the end wall 14 for withdrawing molten iron and slag, respectively.

As previously mentioned, it is necessary in order to meet the thermal requirements of the melting operation to regulate the combustion at the burners 24 so that the coal is burned in large part to $CO_2$ thereby providing a high temperature in the zone 18 which may be from about 2900° F. to about 3500° F. This high temperature combustion gas having an appreciable $CO_2$ content flows through the restricted passageway 21 into the reforming zone 19. The zone 19 has mounted in the end wall 16 thereof a plurality of coal-oxygen burners 33 of the same general type as the burners 24 heretofore described. At least certain of the burners 33 are mounted in directly opposed relation to the combustion gas stream flowing laterally through the passage 21. The burners 33 are fed with an excess of coal so as to produce a CO-rich gas and at the same time effecting reaction of the unburned coal with the $CO_2$ content of the high temperature combustion gases issuing from the passage 21. The moisture or $H_2O$ content of the combustion gases flowing through the passage 21 is also reduced to $H_2$. The endothermic heat requirements of these reduction reactions are supplied by the sensible heat of the high temperature combustion gas and by the heat evolved from the combustion of coal at the burners 33. By reason of the direct impingement between the high temperature combustion gas issuing from the passage 21 and the lower temperature combustion products of the burners 33, a condition of turbulent intermixing and effective heat interchange is realized so that the reforming reactions in the zone 19 are carried out with a high degree of effectiveness. The combustion gas which enters the upper end of the upright reforming zone 19 from the passage 21 passes downwardly through the zone 19. The end wall 16 at the lower end of the reforming zone 19 is provided with a reformed gas outlet 34 through which the reformed combustion gas is withdrawn for subsequent treatment and use in an iron ore reducing zone (not shown).

Because of the endothermic nature of the reduction reactions taking place in the reforming zone 19 and because of the fact that the burners 33 are fed with an excess of fuel so that combustion of the fuel is predominantly to CO rather than $CO_2$, it will be understood that the temperature in the reforming zone 19 and likewise the temperature of the effluent reformed gas withdrawn through the outlet 34 will be substantially lower than the temperature which prevails in the combustion zone 18. For example, the temperature in zone 19 and in the gas outlet 34 may be from about 1900° F. to about 2400° F. as compared with a temperature of from about 2900° F. to about 3500° F. in the melting zone 18. This temperature differential is maintained in the apparatus by means of the insulating wall or thermal barrier 17 and the restricted gas passageway 21 which interconnects the two zones.

In FIGS. 2 and 3 another embodiment of the combined melting and gas reforming apparatus is illustrated wherein the melting zone, designated at 41, is defined by an upright refractory chamber having a relatively thick or elevated base portion 42, a circular side wall 43, and a roof portion 44. The side wall 43 of the melting chamber is provided with an access port 46 and a plurality of circumferentially spaced fuel-oxygen burners 47. In this instance, four such burners 47 are arranged in diametrically opposed relation as best seen in FIG. 3, but it will be understood that any desired number of burners may be utilized. The roof portion 44 has an inlet 48 for introducing reduced iron ore solids downwardly into the melting zone 41 through the burner flames and combustion products. The pools of molten iron and supernatant slag will collect at the base 42 of the melting chamber and may be withdrawn through suitable outlets (not shown).

A refractory duct 49 extends radially from the side wall 43 of the melting chamber and provides a restricted lateral passage 51 for the flow of combustion gas from the melting zone 41 to the lower end of an upright gas reforming zone 52. In this instance, the reforming zone 52 is defined by a refractory chamber of rectangular cross-section having insulated refractory side walls 53 and 54. In the opposite side walls 54 a plurality of fuel-oxygen burners 56 are mounted in opposed relation, three burners being shown in each set merely by way of illustration.

As will be understood, the high temperature $CO_2$-rich combustion gas from the melting zone 41 passes through the restricted lateral passage 51 and then flows upwardly through the reforming zone 52 where it is reformed by the action of the burners 56 which are supplied with excess fuel and oxygen in the manner previously described. The opposed arrangement of the burners 56 acting upon the upwardly flowing combustion gas stream results in a condition of turbulent intermixing and effective heat interchange so as to obtain the desired extent of reforming. An insulated refractory outlet 57 extends laterally from the upper end of the reforming zone 52 for withdrawing the reformed gas stream. For the reasons heretofore mentioned, the melting zone 41 and the reforming zone 52 have respectively high and low temperatures, and the desired temperature differential between the two zones is maintained by reason of the restricted gas passage 51.

Preferably, the bottom wall of the gas transfer duct 49 slopes downwardly, as at 58, and a slag removal outlet 59 is provided at the juncture of the inclined bottom wall 58 and the outermost side wall 53 of the reforming chamber for withdrawing a fluid or semi-solid slag if such is formed in the reforming zone 52. The outermost wall 53 is also provided with an access port 61.

In FIGS. 4 and 5 a modification of the above described embodiment is illustrated, the same reference numerals being employed to indicate the parts of the structure which are identical with the embodiment illustrated in FIGS. 2 and 3. In this form of the invention, the fuel-oxygen burners for the reforming zone 52 are mounted in the top wall, designated at 63, of the reforming chamber instead of in the side walls. Thus, a plurality of burners 62, six being shown in this instance, are disposed in the top wall of the reforming zone 52 and are directed downwardly so that the flames and combustion products impinge in directly opposed relation against the upwardly flowing stream of combustion gas to provide effective intermixing and heat exchange between the high temperature $CO_2$-rich gas from the melting zone 41 and the lower temperature CO-rich flames and combustion products from the burners 62. Otherwise, the structure and operation of the apparatus is essentially as described heretofore in connection with FIGS. 2 and 3.

In FIGS. 6 and 7 another embodiment of the invention is illustrated which may be referred to as a downdraft variation of the apparatus illustrated in FIGS. 2 and 3. Thus, the melting zone is designated at 71 and is defined by refractory lined circular combustion chamber having a base portion 72, a circular side wall 73, and a roof portion 74 having a reduced iron ore solids inlet 76. The side wall 73 is provided with fuel-oxygen burners 77 and an access port 78. The operation of the melting chamber is the same as heretofore described. A radially extending refractory duct 79 provides a restricted gas passageway 81 communicating between the melting zone 71 and the upper end of an upright reforming zone 82 which is of rectangular cross-sectional configuration as defined by a plurality of upright refractory side walls 83 and 84. In the oppositely disposed side walls 83, two sets of fuel-oxygen burners 86 are mounted in opposed relation in the same general manner heretofore shown in FIGS. 2 and 3. At the lower end of the reforming zone 82 there is a laterally extending refractory duct 87 for withdrawing reformed gas. Thus, in this embodiment of the invention, the combustion gas from the zone 71 passes through the restricted gas passageway 81 and thence flows downwardly through the reforming zone 82 and is withdrawn through the lateral outlet 87. During passage of the high temperature $CO_2$-rich combustion gases downwardly through the reforming zone 82 the gas is reformed by the action of the relatively lower temperature CO-rich flames and combustion products from the burners 86. Here again, the temperature differential between the melting zone 71 and the reforming zone 82 is maintained by the restricted gas passageway 81. To further assist in maintaining the desired temperature differential, a refractory insert 88 is provided between the base 72 of the melting hearth and the adjacent side wall 84 of the reforming zone 82, and a plurality of cooling tubes 89 are embedded therein for circulating water or other cooling liquid.

From the foregoing, it will be seen that the invention provides a unitary melting and gas reforming apparatus which is adapted to carry out a high temperature melting and gas generation step in one zone of the apparatus and a relatively lower temperature gas reforming step in another zone of the apparatus. At the same time, the desired temperature differential between the two zones is maintained and heat transfer between the zones is minimized by means of restricted gas passage means between the two zones and also by insulated refractory barrier means which may be water cooled if desired.

Although the invention has been described with particular reference to certain specific structural embodiments thereof, it is to be understood that various modifications and equivalents may be resorted to without departing from the scope of the invention as defined in the appended claims.

I claim:

1. Combined hearth and reformer apparatus for concurrently melting reduced iron ore solids supplied from an external reduction vessel separate from said apparatus and producing CO-rich gas for use in the reduction vessel, comprising a combustion chamber having a lower portion including a hearth for collecting molten iron, burner means disposed in said combustion chamber above said hearth for producing a combustion gas containing $CO_2$, a gas reforming chamber, said chambers being interconnected solely by restricted gas passage means communicating with said combustion chamber above said hearth for supplying said combustion gas solely from said combustion chamber to said reforming chamber without passage of ore solids therebetween, fuel inlet and burner means disposed in said reforming chamber for converting $CO_2$ in said combustion gas to CO, an ore solids inlet connected solely to the combustion chamber of said apparatus above said first-named burner means for supplying reduced iron ore solids to said apparatus from the reduction vessel, and a gas outlet connected to said apparatus solely at said reforming chamber for supplying reformed CO-rich gas to the reduction vessel.

2. The apparatus of claim 1 further characterized in that said combustion chamber and said reforming chamber comprise upright chambers and said gas passage means extends laterally therebetween.

3. The apparatus of claim 1 further characterized by the provision of an elongated horizontally disposed enclosure having an upright dividing wall extending upwardly from the lower boundary of said enclosure and thereby dividing said enclosure into said chambers, said wall terminating below the upper boundary of said enclosure and thereby defining said gas passage means.

4. The apparatus of claim 2 further characterized in that said gas passage means extends between the upper end of said combustion chamber and one end of said reforming chamber, said gas outlet is connected to the opposite end of said reforming chamber, and said fuel inlet and burner means is disposed intermediate said ends of said reforming chamber.

5. The apparatus of claim 2 further characterized in that said gas passage means extends between the upper end of said combustion chamber and the lower end of said reforming chamber, said gas outlet extends laterally from the upper end of said reforming chamber, and said reforming chamber has a top wall with said fuel inlet and burner means mounted in said top wall.

6. The apparatus of claim 3 further characterized in that said enclosure comprises a bottom wall, a top wall, and a pair of oppositely disposed end walls, said dividing wall comprises an insulating wall providing a thermal barrier extending upwardly from said bottom wall intermediate said end walls, said first-named burner means is mounted in one of said end walls, said ore solids inlet is connected to said top wall, said gas outlet is connected to the other of said end walls, and said fuel inlet and burner means is mounted in said other end wall.

7. The apparatus of claim 4 further characterized in that said gas passage means extends between the upper end of said combustion chamber and the lower end of said reforming chamber and said gas outlet extends laterally from the upper end of said reforming chamber.

8. The apparatus of claim 4 further characterized in that said gas passage means extends between the upper end of said combustion chamber and the upper end of said reforming chamber and said gas outlet extends laterally from the lower end of said reforming chamber.

9. The apparatus of claim 5 further characterized in that said gas passage means has a downwardly inclined bottom wall portion and a slag removal outlet at the juncture between said inclined bottom wall portion and the lower end of said reforming chamber.

10. The apparatus of claim 7 further characterized in that said gas passage means has a downwardly inclined bottom wall portion and a slag removal outlet at the juncture between said inclined bottom wall portion and the lower end of said reforming chamber.

References Cited in the file of this patent

UNITED STATES PATENTS

| | | |
|---|---|---|
| 2,681,854 | Kautz | June 22, 1954 |
| 2,750,277 | Marshall et al. | June 12, 1956 |
| 2,776,883 | Marshall et al. | Jan. 8, 1957 |